US012099110B2

(12) United States Patent
Achatz et al.

(10) Patent No.: US 12,099,110 B2
(45) Date of Patent: Sep. 24, 2024

(54) RADAR SYSTEM AND METHOD FOR PERFORMING DIRECTION OF ARRIVAL ESTIMATION

(71) Applicant: Infineon Technologies AG, Neubiberg (DE)

(72) Inventors: Simon Achatz, Munich (DE); Maximilian Eschbaumer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 308 days.

(21) Appl. No.: 17/723,515

(22) Filed: Apr. 19, 2022

(65) Prior Publication Data

US 2023/0333233 A1 Oct. 19, 2023

(51) Int. Cl.
*G01S 13/42* (2006.01)
*G01S 7/35* (2006.01)
*G01S 7/41* (2006.01)
*G01S 13/58* (2006.01)

(52) U.S. Cl.
CPC .............. *G01S 13/42* (2013.01); *G01S 7/354* (2013.01); *G01S 7/356* (2021.05); *G01S 7/417* (2013.01); *G01S 13/584* (2013.01)

(58) Field of Classification Search
None
See application file for complete search history.

(56) References Cited

U.S. PATENT DOCUMENTS

| 2009/0237292 | A1 | 9/2009 | Tigrek et al. |
| 2020/0025906 | A1 | 1/2020 | Kesaraju et al. |
| 2020/0064455 | A1* | 2/2020 | Schroder ............... G01S 13/931 |
| 2020/0225317 | A1 | 7/2020 | Chen et al. |
| 2020/0233076 | A1 | 7/2020 | Chen et al. |

(Continued)

OTHER PUBLICATIONS

J. Fuchs, M. Gardill, M. Lübke, A. Dubey and F. Lurz, "A Machine Learning Perspective on Automotive Radar Direction of Arrival Estimation," in IEEE Access, vol. 10, pp. 6775-6797, 2022, doi: 10.1109/ACCESS.2022.3141587. Published on Jan. 7, 2022. (Year: 2022).*

(Continued)

*Primary Examiner* — Bernarr E Gregory
(74) *Attorney, Agent, or Firm* — VIERING, JENTSCHURA & PARTNER MBB

(57) ABSTRACT

According to various embodiments, a radar system is described comprising a radar receiver configured to receive radio signals, wherein each radio signal is associated with a channel of a plurality of channels, a peak detector configured to perform peak detection using the received radio signals, wherein each detected peak corresponds to a detected object and a direction of arrival estimator configured to, for a detected peak, generate a vector having, for each of the channels, an entry specifying a Doppler Fourier transform result for the channel, supply the vector to a machine learning model trained to output, for each of one or more additional channels, an entry specifying a predicted Doppler Fourier transform result corresponding to the additional channel and perform direction-of-arrival estimation using an output from the machine learning model which the machine learning model outputs in response to being supplied with the vector.

20 Claims, 20 Drawing Sheets

(56) References Cited

U.S. PATENT DOCUMENTS

| | | | |
|---|---|---|---|
| 2020/0295816 A1* | 9/2020 | Kang | G01S 13/584 |
| 2021/0364616 A1* | 11/2021 | Wang | G01S 13/584 |
| 2022/0057486 A1 | 2/2022 | Khairmode et al. | |
| 2022/0404455 A1 | 12/2022 | Liu et al. | |
| 2023/0066386 A1 | 3/2023 | Kim et al. | |
| 2023/0305111 A1* | 9/2023 | Youn | G01S 7/417 |

OTHER PUBLICATIONS

M. Gall, M. Gardill, T. Horn and J. Fuchs, "Spectrum-based Single-Snapshot Super-Resolution Direction-of-Arrival Estimation using Deep Learning," 2020 German Microwave Conference (GeMiC), Cottbus, Germany, 2020, pp. 184-187. (Year: 2020).*

E. Ozanich, P. Gerstoft and H. Niu, "A Deep Network for Single-Snapshot Direction of Arrival Estimation," 2019 IEEE 29th International Workshop on Machine Learning for Signal Processing (MLSP), Pittsburgh, PA, USA, 2019, pp. 1-6, doi: 10.1109/MLSP.2019.8918746. (Year: 2019).*

Z.-M. Liu, C. Zhang and P. S. Yu, "Direction-of-Arrival Estimation Based on Deep Neural Networks With Robustness to Array Imperfections," in IEEE Transactions on Antennas and Propagation, vol. 66, No. 12, pp. 7315-7327, Dec. 2018, doi: 10.1109/TAP.2018.2874430. (Year: 2018).*

O. Bialer, N. Garnett and T. Tirer, "Performance Advantages of Deep Neural Networks for Angle of Arrival Estimation," ICASSP 2019—2019 IEEE International Conference on Acoustics, Speech and Signal Processing (ICASSP), Brighton, UK, 2019, pp. 3907-3911, doi: 10.1109/ICASSP.2019.8682604. (Year: 2019).*

J. Cong, X. Wang, M. Huang and L. Wan, "Robust DOA Estimation Method for MIMO Radar via Deep Neural Networks," in IEEE Sensors Journal, vol. 21, No. 6, pp. 7498-7507, 15 Mar. 15, 2021, doi: 10.1109/JSEN.2020.3046291. (Year: 2021).*

G. K. Papageorgiou, M. Sellathurai and Y. C. Eldar, "Deep Networks for Direction-of-Arrival Estimation in Low SNR," in IEEE Transactions on Signal Processing, vol. 69, pp. 3714-3729, 2021, doi: 10.1109/TSP.2021.3089927. (Year: 2021).*

A. Barthelme and W. Utschick, "DoA Estimation Using Neural Network-Based Covariance Matrix Reconstruction," in IEEE Signal Processing Letters, vol. 28, pp. 783-787, 2021, doi: 10.1109/LSP.2021.3072564. (Year: 2021).*

US search report issued for the corresponding U.S. Appl. No. 17/730,225 in Non-final Office Action of May 28, 2024, 1 page (for informational purposes only).

Office Action of corresponding U.S. Appl. No. 17/730,212, dated Jun. 11, 2024, 21 pages (for informational purposes).

* cited by examiner

FIG 1
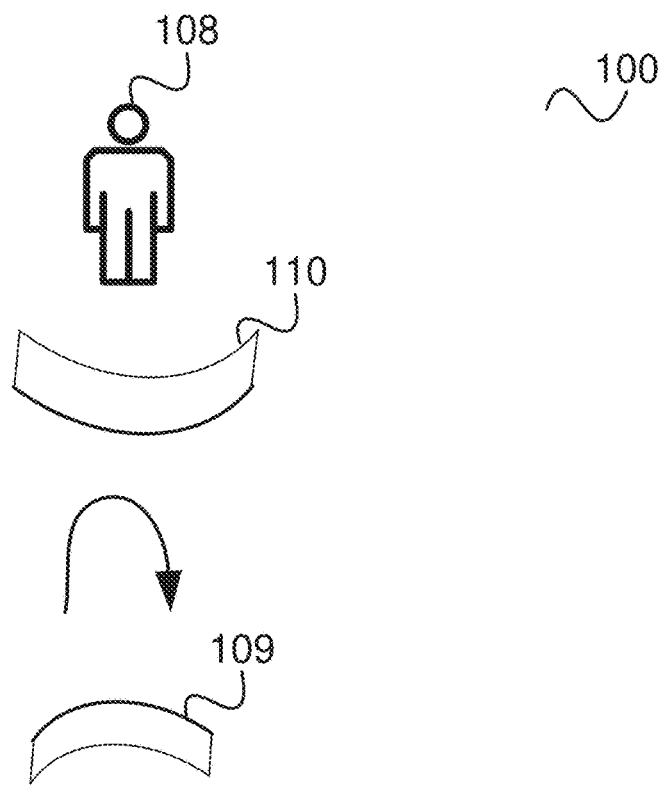
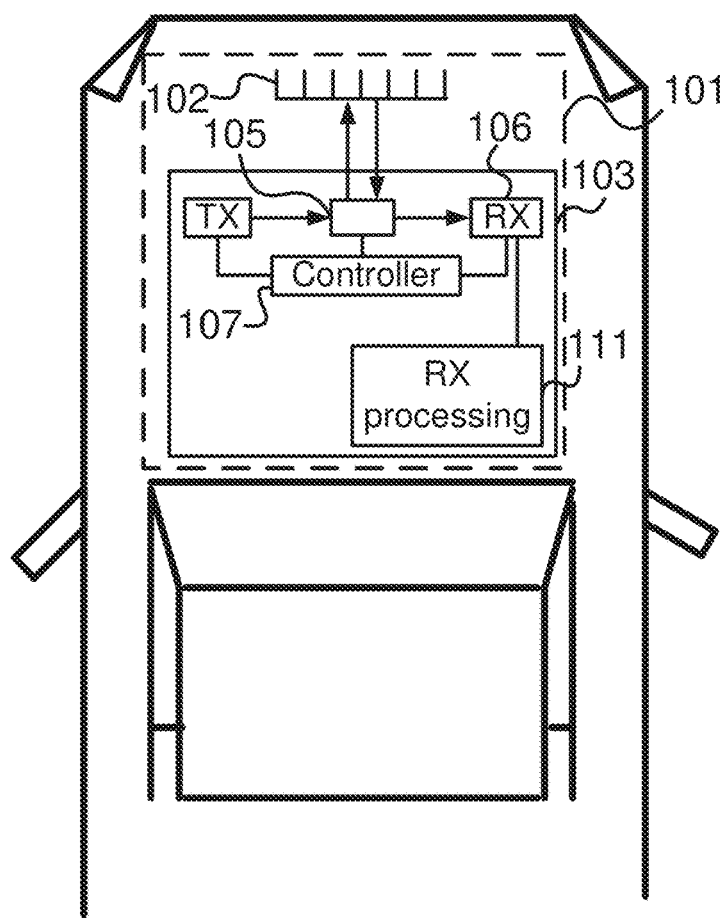

FIG 9 a) Extrapolation of Uniform Arrays (→ increased resolution)  
901 b) Extrapolation of Sparse Arrays (→ increased resolution)  
902 c) Interpolation of Sparse Arrays (→ increased dynamic range)  
903 d) Combination of b) and c)  
904

RADAR SYSTEM AND METHOD FOR PERFORMING DIRECTION OF ARRIVAL ESTIMATION

TECHNICAL FIELD

Exemplary implementations described herein generally relate to radar systems and methods for performing direction of arrival estimation in a radar system.

BACKGROUND

A radar system which receives radar signals via a plurality of receive antennas or channels (which may also be virtual channels formed by pairs of transmit antenna and receive antenna) allows the determination of direction (DoA) of a detected object from the radar signals which have been received via the channels by deriving corresponding input data for the DoA from the received signals. The higher the number of channels is for which radar signals are received and input data for the DoA is generated, the more accurate the DoA is and the better it can resolve two nearby targets. However, the number of channels is limited by the number of transmit and receive antennas that are available and can be handled by the available circuitry.

Therefore, approaches are desirable that allow achieving a high DoA performance in a radar system with a limited number of transmit and receive antennas.

SUMMARY

According to various embodiments, a radar system is provided including a radar receiver configured to receive radio signals, wherein each radio signal is associated with a channel of a plurality of channels, each channel corresponding to a pair of transmit antenna and receive antenna, a peak detector configured to perform peak detection using the received radio signals, wherein each detected peak corresponds to a detected object and a direction of arrival estimator configured to, for a detected peak, generate a vector having, for each of the channels, an entry specifying a Doppler Fourier transform result for the channel calculated from radio signals transmitted from the transmit antenna and received by the receive antenna of the pair to which the channel corresponds, supply the vector to a machine learning model trained to output, for each of one or more additional channels, an entry specifying a predicted Doppler Fourier transform result corresponding to the additional channel and perform direction-of-arrival estimation using an output from the machine learning model which the machine learning model outputs in response to being supplied with the vector.

According to a further embodiment, a method for direction of arrival estimation according to the above radar system is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 1 shows a radar arrangement.

FIG. 9 illustrates extrapolation and interpolation of DoA determination input data.

DESCRIPTION OF EXEMPLARY IMPLEMENTATIONS

Figure 2:
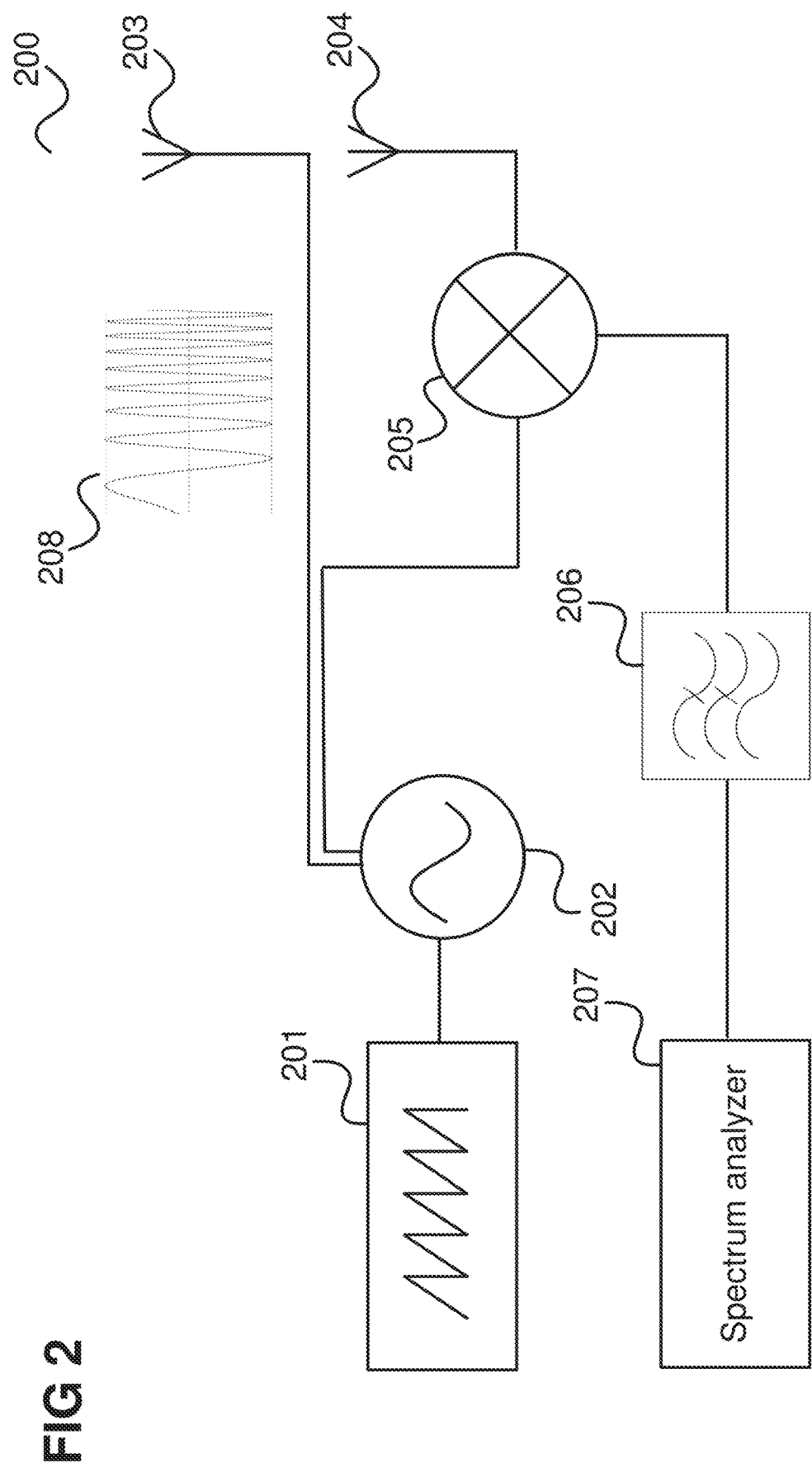
FIG. 2 illustrates an FMCW (Frequency Modulated Continuous Wave) radar system.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

FIG. 1 shows a radar arrangement 100.

The radar arrangement 100 includes a radar device (implementing a radar system) 101 that includes an antenna arrangement 102 and a radar control device 103. It should be noted that, while the radar system is in this example implemented by a radar device 101, the radar system may be also implemented by an arrangement of devices, e.g. including an electronic control unit (ECU) or a vehicle controller and/or a device (or arrangement) implementing an Advanced Driver Assistance Systems (ADAS).

The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows:
1. The one or more transmitters 104 transmit a transmit signal 109 via the antenna arrangement 102.
2. The transmit signal 109 is reflected by a target (object) 108;
3. The radar device 101 receives the echo 110 of the transmitted signal as receive signal.

From the received signal, the radar control device 103 (e.g. a radar signal processing circuit 111) calculates information about position and speed of the object 108.

For example, the radar device 101 may be installed in a vehicle for detection of nearby objects, in particular for autonomous driving.

The transmit signal 109 may include a plurality of pulses. Pulse transmission includes the transmission of short high-power bursts in combination with times during which the radar device 101 listens for echoes 110. This is typically not optimal for a highly dynamic situation like in an automotive scenario.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar or phase-modulated continuous wave (PMCW) radar.

FIG. 2 illustrates an FMCW radar system 200.

In an FMCW radar system, rather than sending a transmit signal with a constant frequency, the frequency of the transmit signal is periodically ramped up and reset according to a saw tooth (or alternatively a triangle) waveform 201. The saw tooth waveform 201 may for example be generated by a ramping circuit (or "ramper"). The saw tooth waveform 201 frequency-modulates an oscillator 202 and the resulting transmit signal is fed to a transmit antenna 203 (by means of a radio frequency (RF) frontend).

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps (or "ramps"), which are result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT, also denoted as range FFT) as well as velocity information (by a second stage FFT, also denoted as Doppler FFT) from the receive signal. It should be noted that the spectrum analyzer 207 works on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207. At least some of the various components of the receive path may accordingly be part of a digital or analog frontend.

To further allow determination of a direction of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110, for example by means of a third stage FFT (also denoted as angular FFT). Accordingly, a radar receiver may include a mixer 205, an analog filter 206 and an ADC for each receive antenna.

The signals received by a plurality of antennas may be processed by means of an MMIC (Monolithic Microwave Integrated Circuit).

Figure 3:
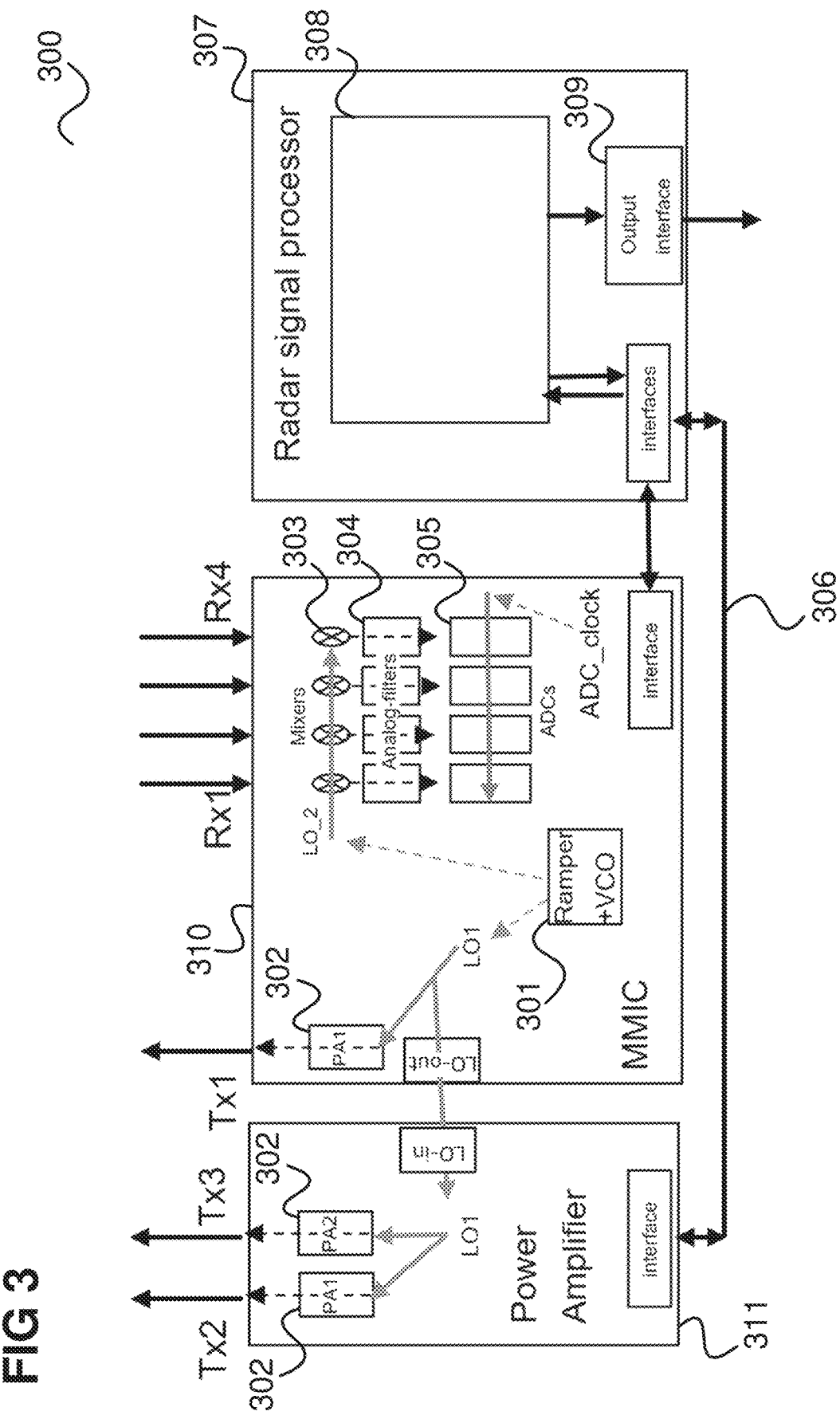
FIG. 3 shows a radar device having a plurality of transmit antennas and receive antennas.

FIG. 3 shows a radar device 300 having a plurality of transmit antennas and receive antennas.

The radar device 300 includes an MMIC 310 which includes a (voltage-controlled) oscillator with ramper 301 which supplies transmit amplifiers 302 (one for each transmit antenna) and mixers 303 with a transmit signal as described with reference to FIG. 2.

In the example of FIG. 3, two of the transmit amplifiers 302 are provided by a power amplifier 311 to which the transmit signal is provided via a transmit signal interface 312. However, the transmit amplifiers may also all be provided within the MMIC 310

There is one mixer 303 in the MMIC 310 for each receive antenna. Analog filters 304 (corresponding to filter 206) filter the mixed signals and analog-to-digital converters (ADCs) 305 generate digital signals from the filtered analog signals. The MMIC 310 transfers their output via a digital interface 306 to a radar signal processor 307.

The radar signal processor 307 has a radar signal processing circuit 308 (for example corresponding to the radar signal processing circuit 111), implements a spectrum analyzer and performs object detection and determination of direction of arrival as explained in the following with reference to FIG. 4.

Figure 4:
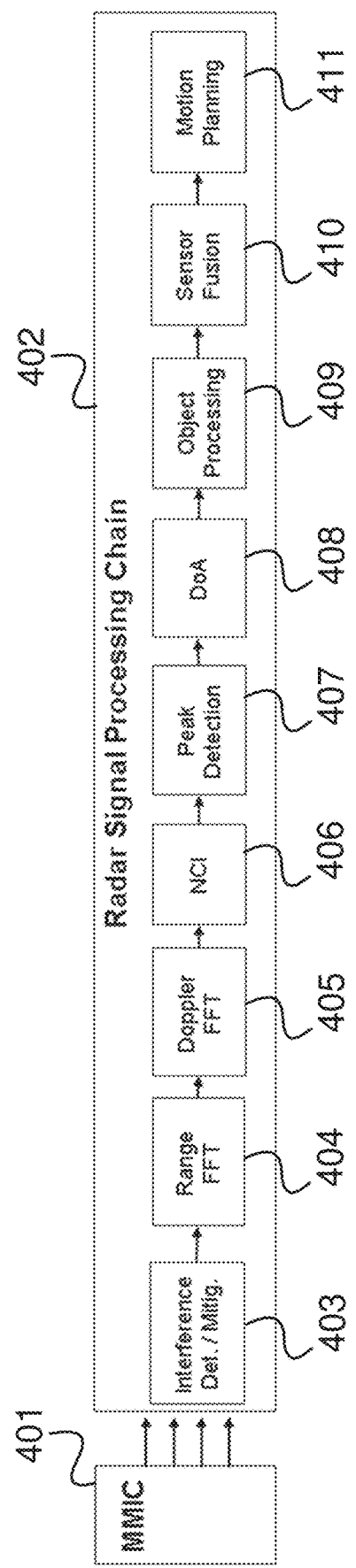
FIG. 4 illustrates the processing of radar signals.

FIG. 4 illustrates the processing of radar signals received using an MMIC 401.

The MMIC 401 is for example part of the receiver 106. The MMIC 401 is coupled with a plurality of antennas and is supplied with received signals from the respective plurality of antennas.

It should be noted that the number of receive signals that an MMIC may process in parallel is limited (and thus an MMIC can only serve a limited number of receive antennas), multiple MMICs may be used to allow using a higher number of receive antennas. In that case, there are multiple MMICs instead of the single MMIC 401 but the processing is similar.

The MMIC 401 performs processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. The MMIC 401 supplies the resulting digitized receive signals to a radar signal processing chain 402 (e.g. implemented by radar signal processor 307).

The radar signal processing chain 402 performs interference detection and mitigation 403 on the digitized receive signals followed by a first FFT (Fast Fourier Transform) 404, also referred to as range FFT, and a second FFT 405, also referred to as Doppler FFT. Based on the outputs of the FFTs 404, 405 the radar signal processing chain 402 determines range information as well as velocity information (e.g. in form of a R/D (range-Doppler) map) for one or more objects in 407.

It should be noted that the output of the second FFT 405 is a two-dimensional FFT result (wherein one dimension corresponds to range and the other to velocity) for each antenna (namely based on the processing of the samples of the receive signal received by this specific antenna). The result of the first FFT 404 includes, for each receive antenna, a complex value for a range bin.

The second FFT 405 goes over the result of the first FFT 404 over multiple chirps, for each range bin, generating, per range bin, a complex value for each Doppler bin. Thus, result of the second FFT stage 405 includes, for each receive antenna, a complex value for each combination of Doppler bin and range bin (i.e. for each Doppler/range bin). This can be seen to give an antenna-specific R/D map.

In 406, to generate an aggregate R/D map, the radar processing chain 402 combines the MMIC-specific R/D maps, e.g. by summing them up, for example by coherent or non-coherent integration. In 407, it then estimates the velocity and range of specific objects by identifying peaks in the aggregate R/D map, e.g. by means of a CFAR (Constant False Alarm Rate) algorithm. It should be noted that since an FFT output consists in general of complex values, a peak selection in an FFT output (such as the aggregate R/D map) may be understood as a selection based on absolute values (i.e. complex magnitudes of the complex outputs) or power (i.e. squares of absolute values).

In 408, the radar signal processor 307 may further determine the direction of the one or more objects. This can be done based on the phase differences of the output values of the second stage FFT between different receive antennas and may include a third stage FFT (angular FFT).

Based on the results of this processing, further processing such as object classification, tracking, generation of an object list, e.g. including sensor fusion at some point, and decision-making (e.g. motion planning in autonomous driving) may be performed in 409, 410 and 411. This may at least partially be carried out by a further component such as a vehicle controller. For this, the radar signal processor 307 may output processing results via an output interface 309.

The digitized receive signals provided by the MMIC 401 are typically arranged in a data cube.

Figure 5:
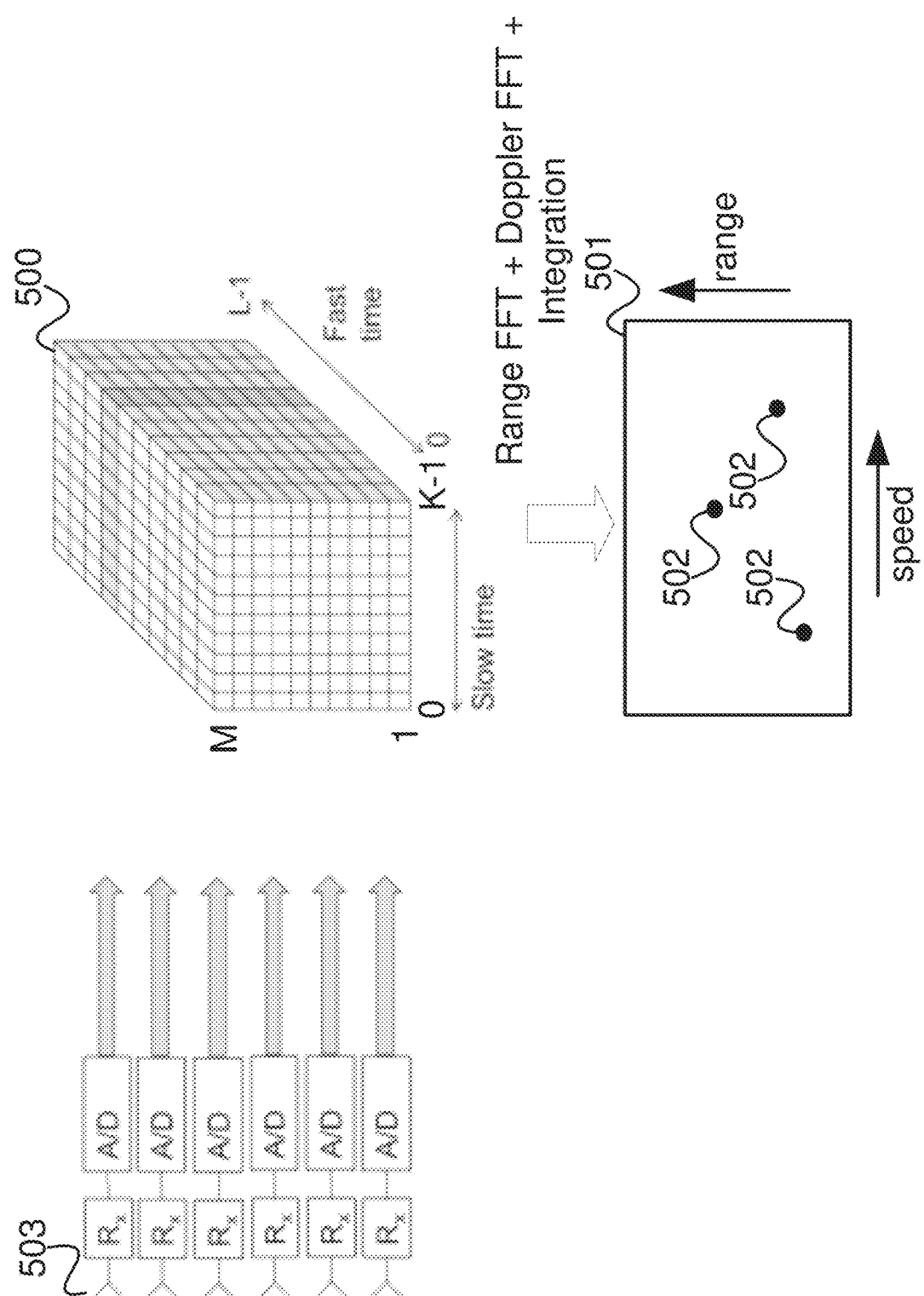
FIG. 5 shows a data cube.

FIG. 5 shows a data cube 500.

The data cube 500 includes digitized samples of receive signals from M antennas forming a receive antenna array 503. The MMIC 401 performs analog/digital conversion to generate the digitized samples.

For example, for each chirp, the received signal is sampled to have L samples (e.g. L=512).

The L samples collected for each chirp are processed by the first FFT 404.

The first FFT 404 is performed for each chirp and each antenna, so that the result of the processing of the data cube 500 by the first FFT 404 has again three dimensions and may have the size of the data cube 500 but does no longer have values for L sampling times but instead values for L/2 range bins (because usually the second half of the range bins is omitted because it is a repetition of the first half due to the FFT being applied to real input values).

The result of the processing of the data cube 500 by the first FFT 404 is then processed by the second FFT 405 along the chirps (for each antenna and for each range bin).

The direction of the first FFT 404 is referred to as fast time whereas the direction of the second FFT 405 is referred as slow time.

The result of the second FFT 405 gives, when aggregated over the antennas (in 406), a range-Doppler (R/D) map 501 which has FFT peaks 502 (i.e. peaks of FFT output values (in terms of absolute values) for certain range/speed combinations (i.e. for certain range-Doppler bins) which the radar signal processor 307 expects to correspond to detected objects 108 (of a certain range and speed).

As explained above, in 408, DoA (direction of arrival) determination is carried out using the results of the peak detection, wherein, for each detected peak, the results of the Doppler FFT 405 for that peak (i.e. for the range-Doppler bin) are taken from the R/D map of each antenna. This means that the input to the DoA 408 is, for each peak (i.e. each estimated object), a vector including, for each antenna, the entry that the R/D map for that antenna has for the range-Doppler bin where that peak is located in the aggregate R/D map.

The radar system 101 has a certain angular resolution in the DoA determination. The angular resolution can be improved by increasing the aperture of the radar system. Specifically, dynamic range and probability of detection can be improved by reducing sidelobes in the angular FFT spectrum.

Figure 6:
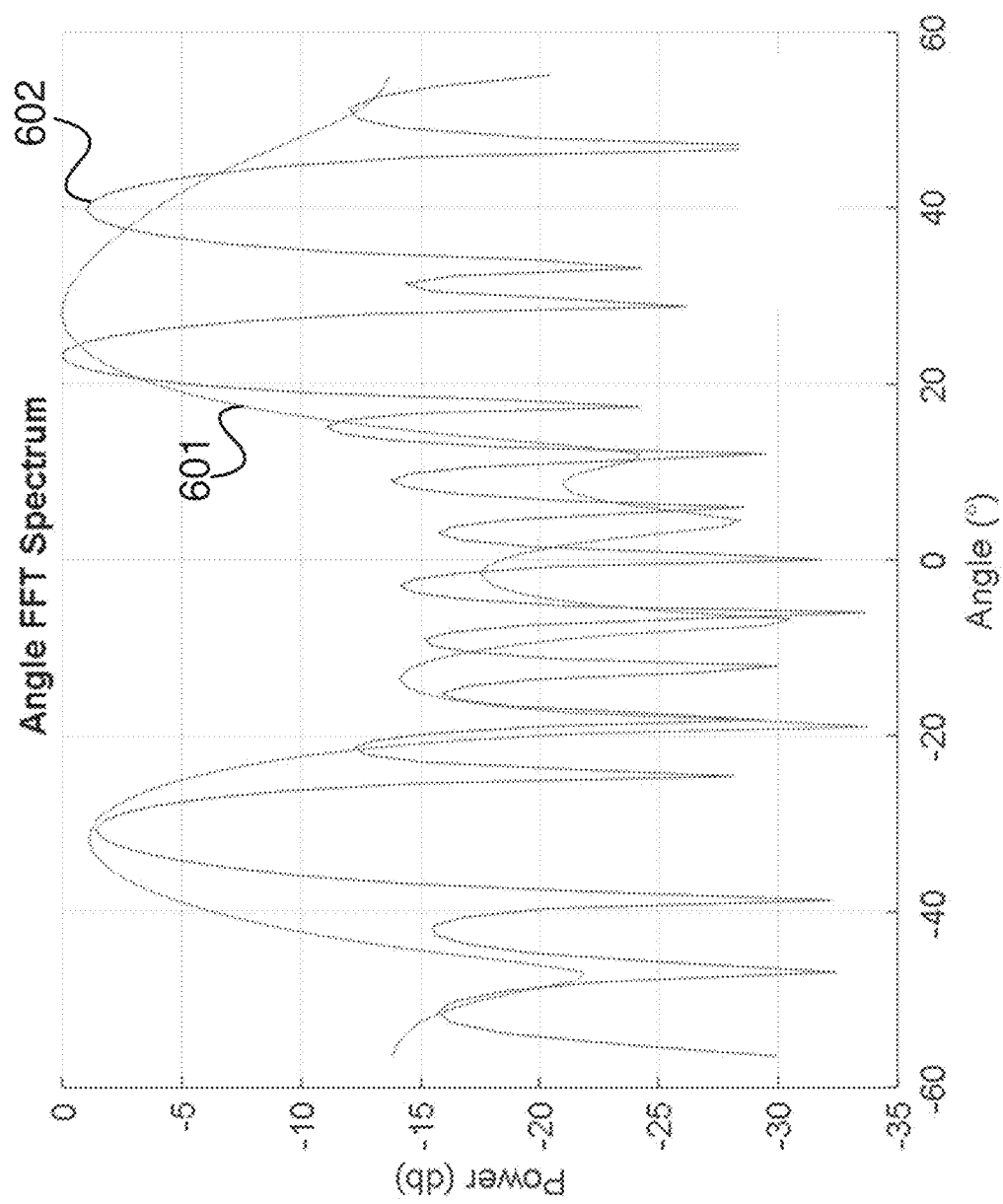
FIG. 6 shows a comparison of an angular FFT (Fast Fourier Transform) spectrum for eight antennas and 16 antennas.

FIG. 6 shows a comparison of an angular FFT spectrum (in terms of power over angle) for eight antennas (first graph 601) and 16 antennas (second graph 602).

As illustrated, the lobe (or beam) of a single target becomes narrower with higher aperture and two targets can only be separated with sufficient aperture.

Figure 7:
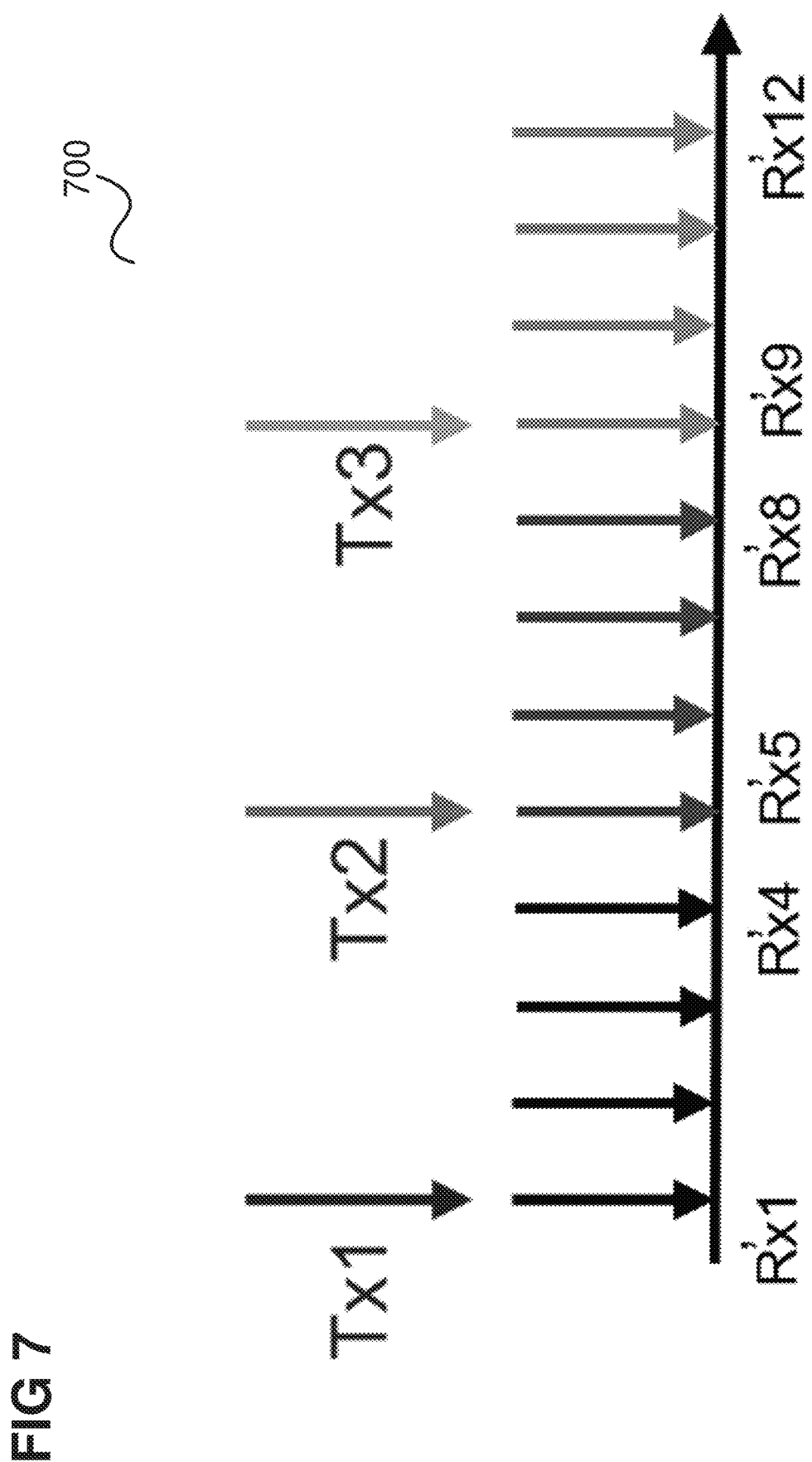
FIG. 7 shows diagrams illustrating virtual radar channels.

The principle of MIMO (multiple-input multiple-output) is to expand the aperture of the radar device using channels formed by the combination of the receive antenna array and of the transmit antenna array. In the example of FIG. 3, where there are three transmit antennas (Tx1 to Tx3) and four receive antennas (Rx1 to Rx4) the result are 12 channels as illustrated in FIG. 7. These channels formed of pairs of one of multiple transmit antennas and one of multiple receive antennas are also referred to as virtual channels. Equivalently, this may be seen as an array of virtual receive antennas (one per channel, with a single transmit antenna.

FIG. 7 shows a diagram 700 illustrating virtual radar channels.

The diagram 700 shows the virtual receive antenna array of the MMIC 310. Each transmit antenna creates one virtual receive antenna per actual receive antenna (Rx1 to Rx4), resulting in twelve virtual receive antennas denoted as (Rx'1 to Rx'12). In this example, with ideal phase differences between Tx1, Tx2 and Tx3, the virtual receive antennas form an antenna array of uniformly spaced receive antennas.

According to various embodiments, a machine learning model is used to extend (artificial) aperture by computing information for additional channels. According to various embodiments, the machine learning model is based on a neural network (i.e. deep learning) which may be trained using (weakly) supervised learning.

Figure 8:
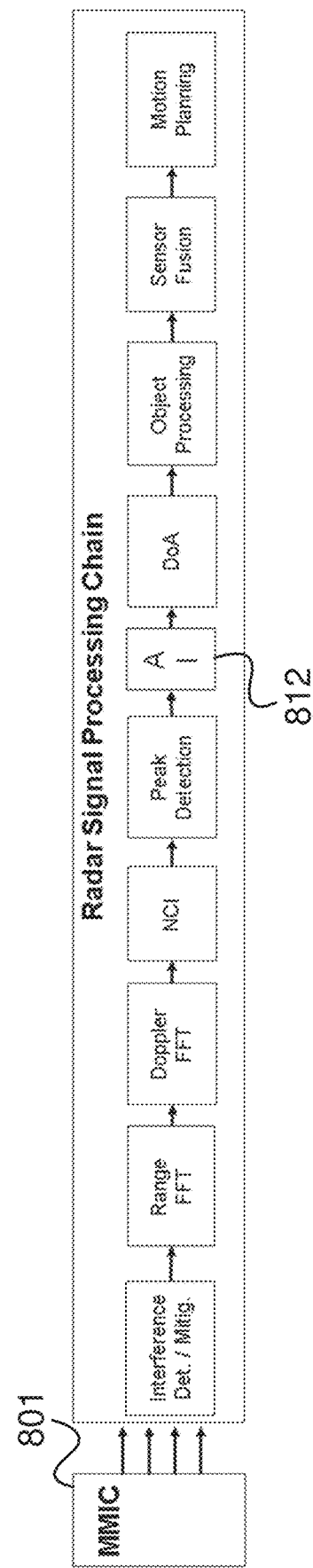
FIG. 8 illustrates the inclusion of an AI (artificial intelligence) processing into the radar signal processing chain of FIG. 4.

FIG. 8 illustrates the inclusion of an AI (artificial intelligence) processing 812 into the radar signal processing chain of FIG. 4 before the DoA determination 808.

So, before determining (estimating) DoA for the peaks, the input for the DoA (vectors of second FFT results for each identified peak) is processed by a neural network which generates a processed input which corresponds to an increased number of antenna elements by extra- and interpolation.

FIG. 9 illustrates this extrapolation and interpolation for a virtual receive antenna array with eight antennas.

In a first diagram 901, it is assumed that the MIMIC 801 only provides digitized receive samples for the third to sixth (virtual) antenna of the virtual receive antenna array (which form a uniform sub-array). The neural network generates second FFT result data (for the detected peaks) of the first, second, seventh and eight antenna by extrapolation of a uniform array. This allows higher resolution.

In a second diagram 902, it is assumed that the MMIC 801 only provides digitized receive samples for the second, third, fifth and sixth (virtual) antenna of the virtual receive antenna array (which form a sparse array, i.e. an antenna array where not all positions (e.g. at most half of the positions) are occupied). The neural network generates second FFT result data (for the detected peaks) of the first and eight antenna by extrapolation of a sparse array. This allows higher resolution.

In a third diagram 903, it is assumed that the MMIC 801 only provides digitized receive samples for the second, fifth, sixth and eighth (virtual) antenna of the virtual receive antenna array (which form a sparse array). The neural network generates second FFT result data (for the detected peaks) of the third, fourth and seventh antenna by interpolation of a sparse array. This allows higher dynamic range.

In a fourth diagram 904, it is assumed that the MIMIC 801 only provides digitized receive samples for the second, fifth, sixth and eighth (virtual) antenna of the virtual receive antenna array (which form a sparse array). The neural network generates second FFT result data (for the detected peaks) of the first, third, fourth and seventh antenna by extrapolation and interpolation of a sparse array.

Training data for the neural network may be acquired via simulation (every corner case and every possible combination can be generated) or via real measurements or combination of both. A first option is to simulate ADC data (i.e. digitized radar signal samples) for a certain scene (i.e. with one or more target objects) and process the simulated ADC data to generate a corresponding DoA determination input vector. A second option is to simulate DoA determination input vectors directly for a scene.

For example, training data is generated by simulation runs with following parameters drawn from a random, uniform distribution:
Number of targets $x_0=[1 \ldots n]$
Angles of targets $x_1=[-90°, 90°]$
RCS (radar cross section) of the targets $x_2=[-5$ dbsm, 20 dbsm]
Channel phase error $x_3=[-10°, 10°]$
SNR of targets $x_4=[5$ dB, 20 dB]

In the input to the neural network, a complex-valued vector, e.g. $[c_0, c_1, c_2, c_3]$ in case of four channels ($c_i$ is the R/D map entry for channel i for a respective peak), may be reordered into a real-valued vector, e.g. $[r_0, r_1, r_2, r_3, i_0, i_1, i_2, i_3]$ to keep the relationship between real and imaginary part.

The neural network may for example be (or include) an autoencoder or an MLP (multi-layer perceptron) or a recurrent neural network (RNN), e.g. with LSTM (long short-term memory)

The number of nodes of the input layer is equal to length of the input vector times two (complex values concatenated). The input vector may include, for each virtual channel (for which the MMIC 801 provides data), the entry that the R/D map for that antenna has for the range-Doppler bin where that peak is located in the aggregate R/D map (so four complex, i.e. eight real values for the examples of FIG. 9). Alternatively, the input vector may have placeholders for the virtual channels for which the neural network is supposed to generate DoA determination input data (so, for example eight complex, i.e. 16 real values for the example of diagram 904 since the virtual receive antenna array is supposed to be completely filled).

The hidden layers of the neural network may be fully-connected layers with varying size and any activation function, e.g. ReLU.

The output layer is a regression layer with a number of nodes equal to the output vector length times two (since again, complex values are split into two real values). Similar as for the input vector, the output vector may have components for all virtual receive antennas (since the neural network may also update the data for virtual receive antennas for which the MIMIC 801 provides data) or only components for the virtual receive antennas for which the MIMIC 801 does not provide input data and for which DoA determination input data should be generated by the AI processing 812.

Figure 10:
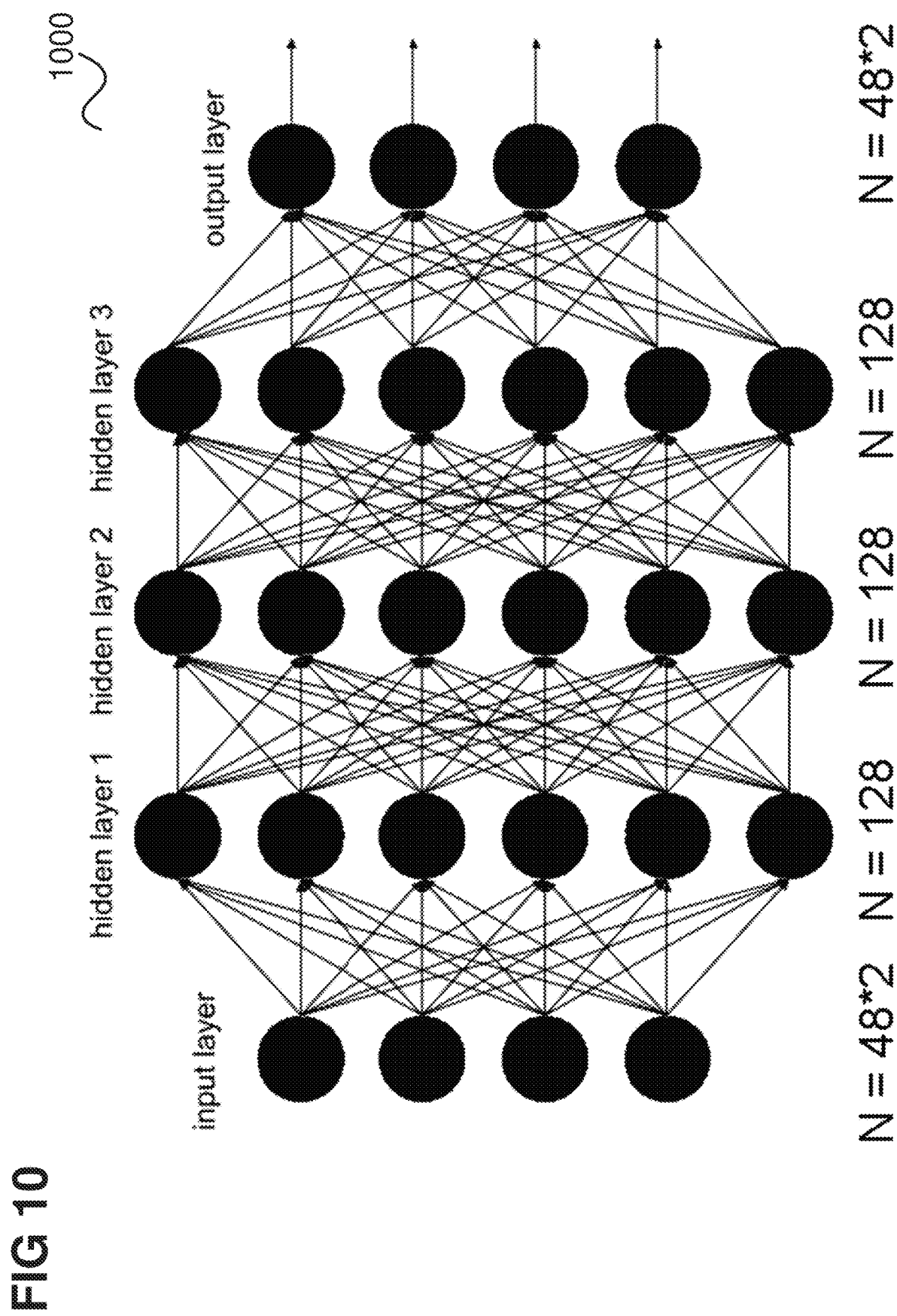
FIG. 10 shows an example of a neural network having an MLP (multi-layer perceptron) structure for extrapolation of 12 to 48 virtual channels.

FIG. 10 shows an example of a neural network 1000 having an MLP structure for extrapolation of 12 to 48 virtual channels with exemplary values of the number of nodes.

Figure 11:
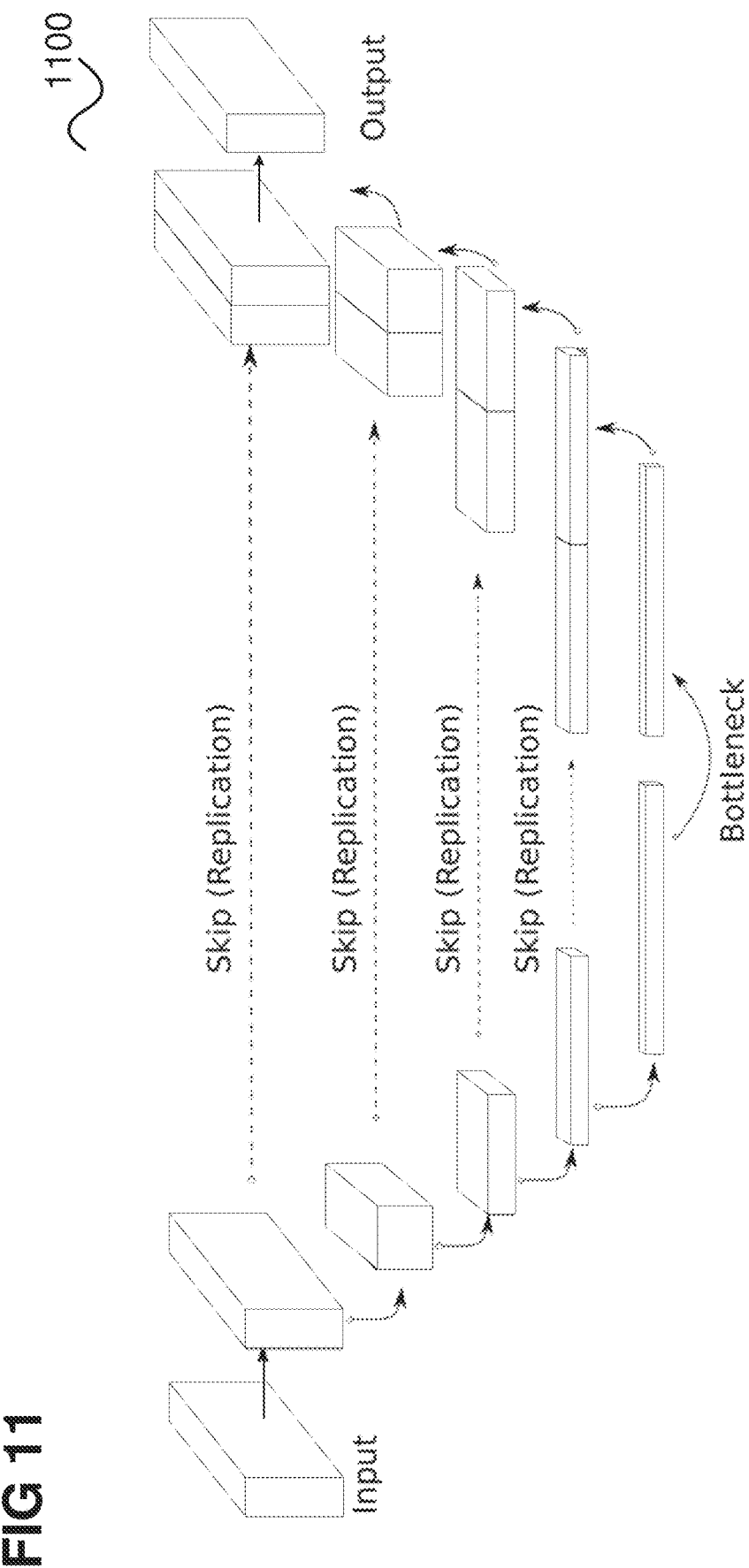
FIG. 11 shows an example of a neural network having a UNet structure.

FIG. 11 shows an example of a neural network 1100 having a UNet structure.

UNet is one exemplary neural network architecture with horizontal skip lines (not all information needs be represented in bottleneck layer).

For the UNet (or an autoencoder), the ground truth may be the ideal training data and the input incomplete or noisy training data. The autoencoder learns the relationship between ideal and incomplete or noisy data.

Figure 12:
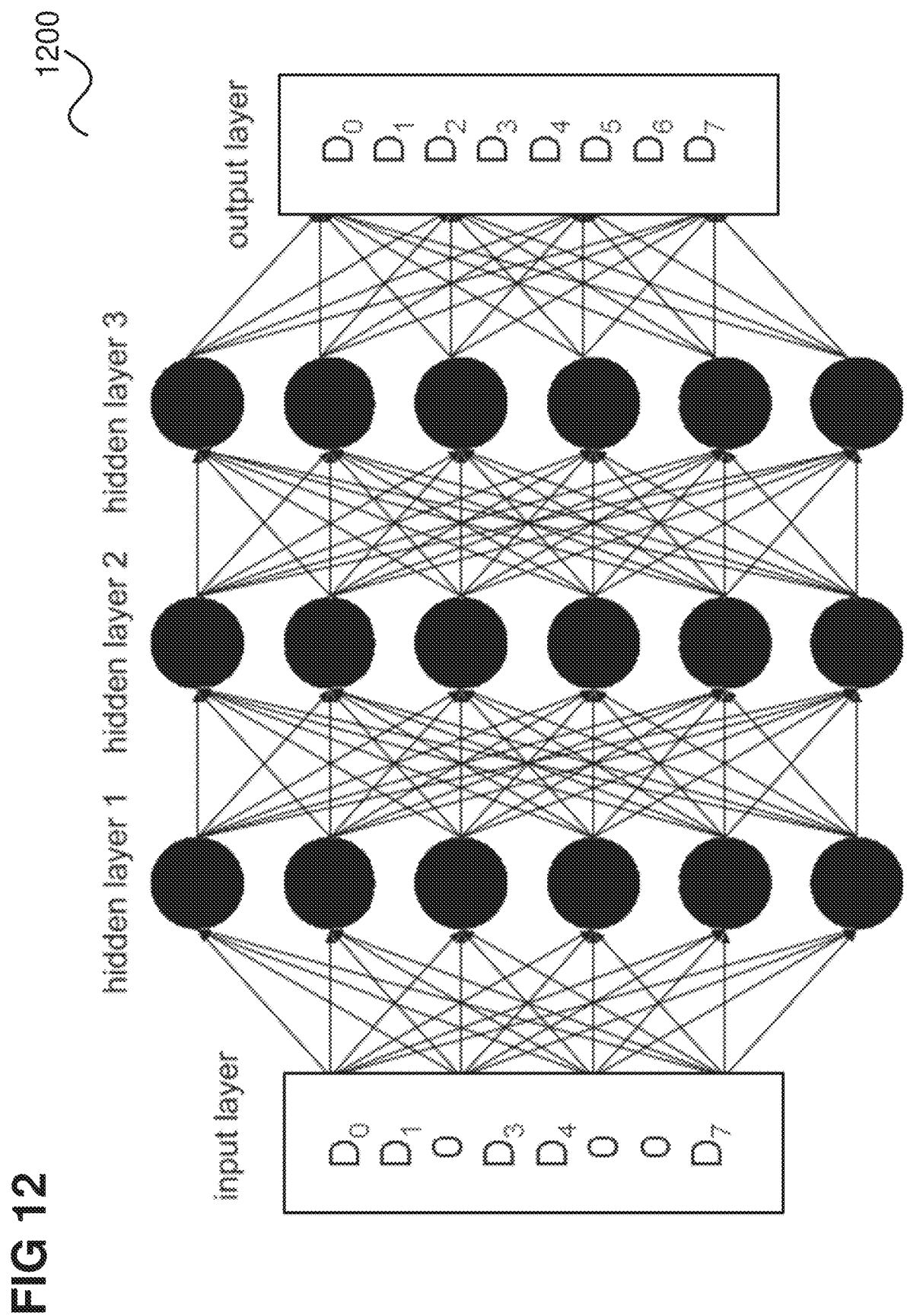
FIG. 12 illustrates training for a neural network having an MLP structure.

FIG. 12 illustrates training for a neural network 1200 having an MLP structure.

For training, data D is simulated or recorded using a full virtual receive antenna array (eight virtual channels in this example). Then, the extrapolation or interpolation factor is set and the data for some channels (2,5,6 in the example shown) is set to zero (i.e. channel data for these channels is zeroed). The neural network 1200 is then trained with Input: data with zeroed channel data and random channel errors Ground truth output: original data (with or without channel errors so the neural network 1200 may in addition be trained for error correction).

The neural network is thus trained to learn the relationship between zeroed channel data and original channel data.

Figure 13:
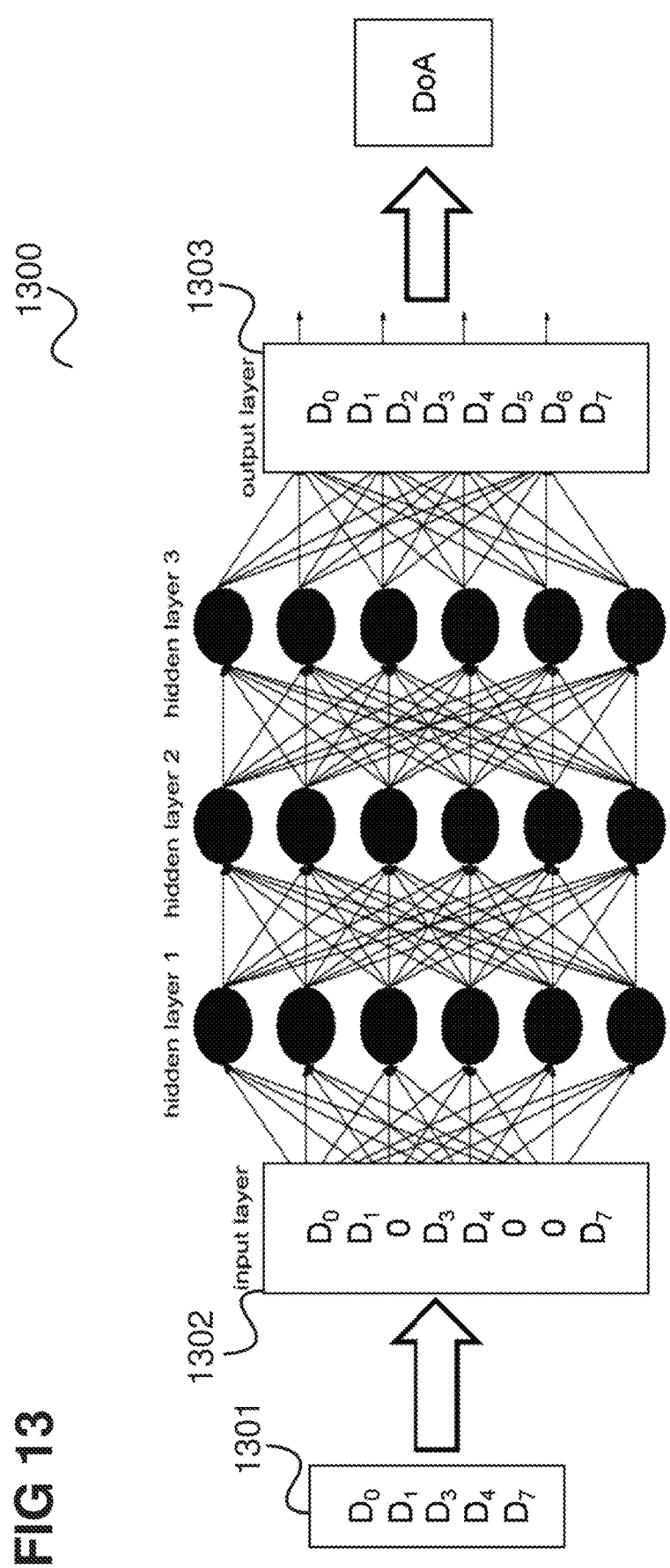
FIG. 13 illustrates inference for a neural network having an MLP structure trained as illustrated in FIG. 12.

FIG. 13 illustrates inference for a neural network 1300 having an MLP structure trained as illustrated in FIG. 12.

In this example, the AI processing input is data 1301 for five virtual channels (i.e. a DoA determination input vector with entries for five (virtual) receive antennas). In the AI processing, the received data is zero-padded to an input vector 1302 for the neural network 1300.

The neural network is applied (run) on this input vector 1302 to produce an output vector 1303 (size=8, i.e. +60% increase in elements). The output vector 1303 is then supplied to the DoA determination (which uses an algorithm of choice (e.g. a third state FFT, or multiple signal classification (MUSIC)).

It should be noted that in inference, the neural network (since it outputs the DoA determination input data for the whole virtual channel array) may modify (update) the existing measured values (i.e. those derived for channels for which the MMIC 801 provides samples).

Figure 14:
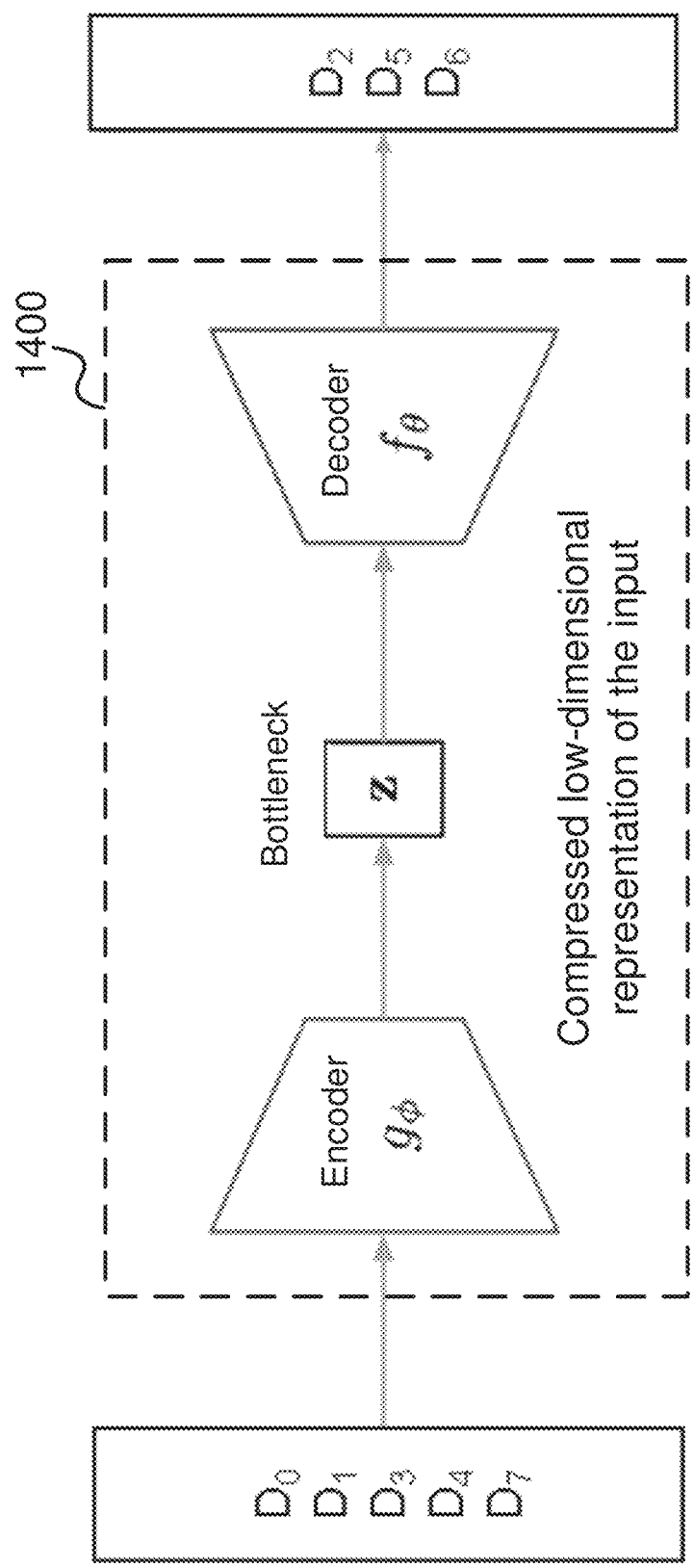
FIG. 14 illustrates training for a neural network with an autoencoder structure.
Figure 15:
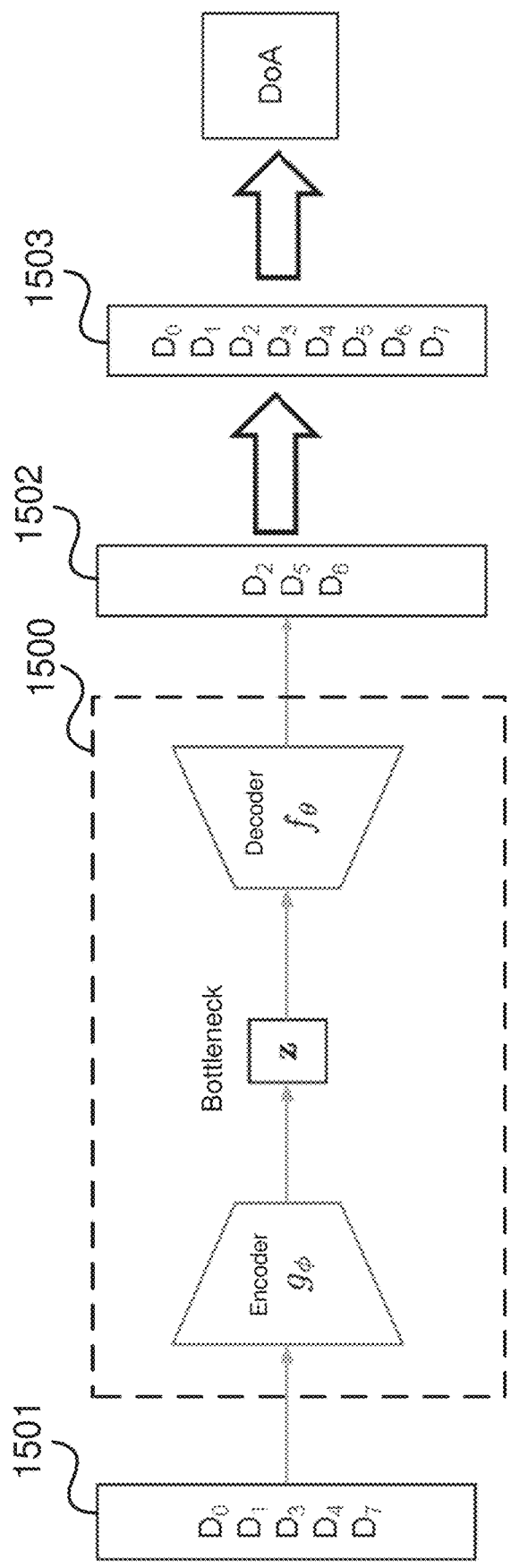
FIG. 15 illustrates inference for a neural network with an autoencoder structure trained as illustrated in FIG. 14.

Alternatively, the neural network may only provide data for the missing channels (i.e. for which the MMIC 801 does not provide data). The network size can then be smaller (because of fewer input nodes and output nodes) but the existing data (for the channels for which the MMIC 801 has provided samples) is not updated. This is illustrated in FIGS. 14 and 15 for a neural network with an autoencoder structure but may also be applied to a neural network having an MLP structure. (On the other hand, the option of FIGS. 12 and 13 with zeroing and full output vectors may also be applied to a neural network with autoencoder structure).

FIG. 14 illustrates training for a neural network 1400 with an autoencoder structure.

For training, data D is simulated or recorded using a full virtual receive antenna array (eight virtual channels in this example). Then, the extrapolation or interpolation factor is set and the data for some channels (2,5,6 in the example shown) is removed. The neural network 1400 is then trained with Input: data for selected channels (i.e. without those which have been removed)

Ground truth output: removed data.

The neural network is thus trained to learn the relationship between selected and removed data.

FIG. 15 illustrates inference for a neural network 1500 with an autoencoder structure trained as illustrated in FIG. 14.

In this example, the AI processing input is data 1501 for five virtual channels (i.e. a DoA determination input vector with entries for five (virtual) receive antennas). This input data 1501 is also the input vector for the neural network 1500.

The neural network is applied (run) on this input vector 1501 to produce an output vector 1502 having data for additional three channels. The output vector 1502 is put together with the input vector 1501 to an input vector 1503 for the DoA determination (which uses an algorithm of choice (e.g. a third state FFT, or multiple signal classification (MUSIC)).

Figure 16:
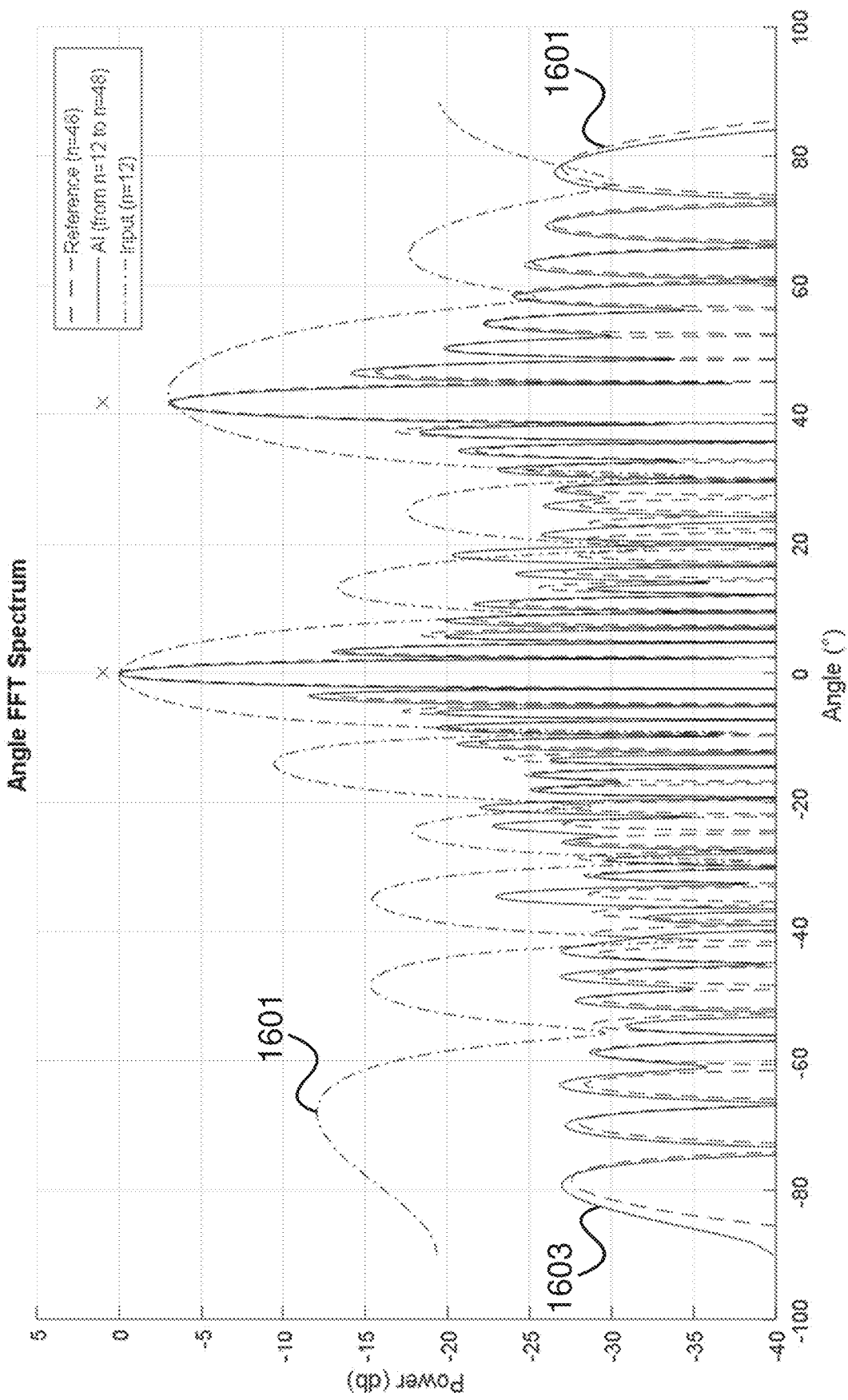
FIG. 16 illustrates results for a 12 to 48 channel extrapolation.

FIG. 16 illustrates results for a 12 to 48 channel extrapolation (+400%).

A first graph 1601 shows the angular FFT spectrum (in terms of power over angle) for reference data for 48 antennas, a second graph 1602 shows the angular FFT spectrum for the neural network input (i.e. for 12 antennas) a third graph 1603 shows the angular FFT spectrum for the neural network output.

There are two targets at 0° and 40°, respectively.

Similarly to the example of 901, an array extrapolation is performed: the neural network generates channel data for 18 virtual receive antennas to the left and 18 virtual receive antennas in addition to the existing data for 12 antennas for which the MIMIC 801 provides samples.

Figure 17:
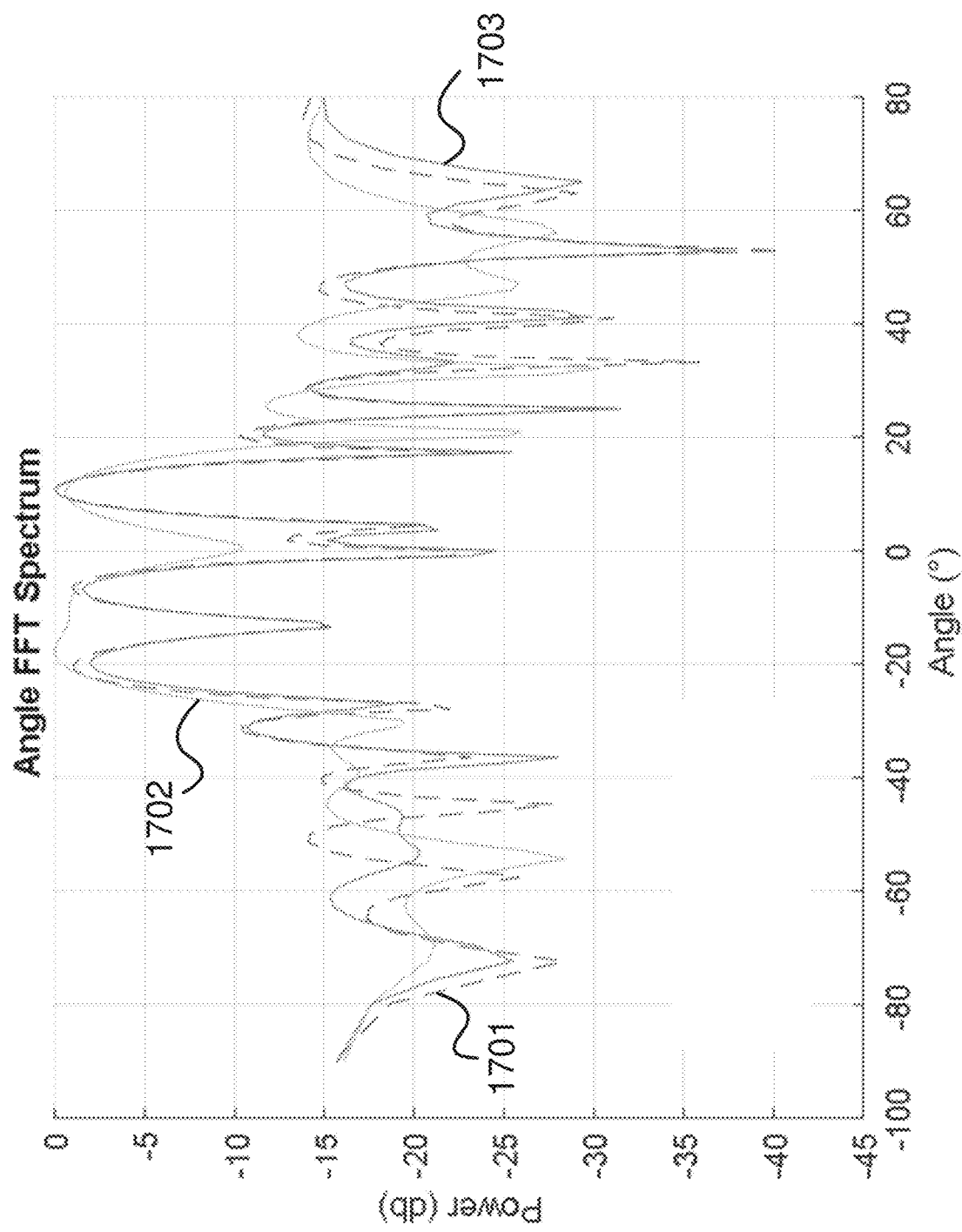
FIG. 17 illustrates results for a 12 to 16 channel extrapolation.

FIG. 17 illustrates results for a 12 to 16 channel extrapolation (+25%).

A first graph 1701 shows the angular FFT spectrum (in terms of power over angle) for reference data for 16 antennas, a second graph 1702 shows the angular FFT spectrum for the neural network input (i.e. for 12 antennas) a third graph 1703 shows the angular FFT spectrum for the neural network output.

There are three targets in this example.

Similarly to the example of 901, an array extrapolation is performed: the neural network generates channel data for two virtual receive antennas to the left and two virtual receive antennas in addition to the existing data for 12 antennas for which the MIMIC 801 provides samples.

It can be seen that with the neural network output, the peaks are very accurate. The sidelobes are not equal, but at the same level as for the reference (due to remaining error in network).

Figure 18:
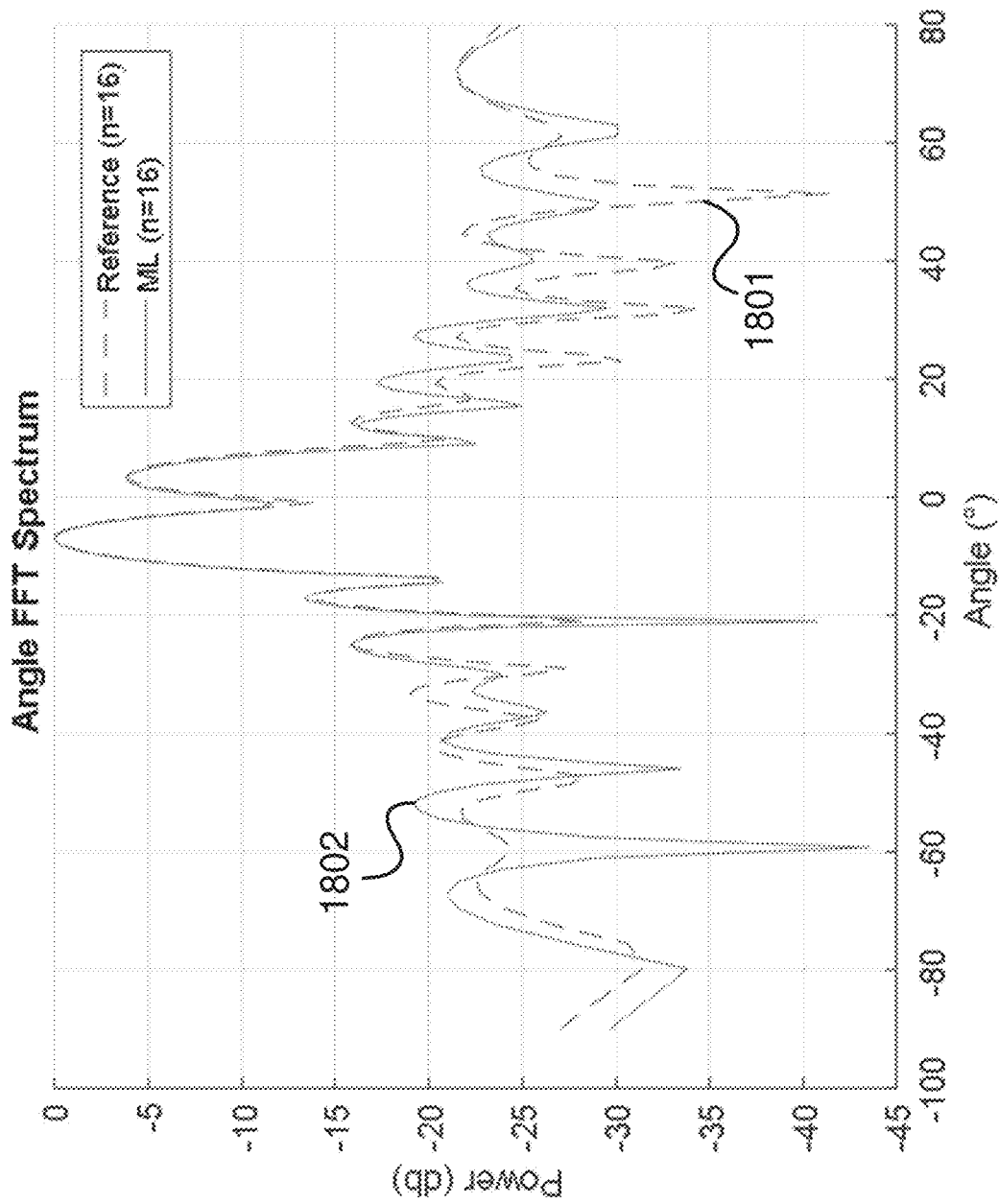
FIG. 18 illustrates results for a 10 to 16 channel extrapolation.

FIG. 18 illustrates results for a 10 to 16 channel extrapolation (+60%).

A first graph 1801 shows the angular FFT spectrum (in terms of power over angle) for reference data for 16 antennas and a second graph 1802 shows the angular FFT spectrum for the neural network output.

There are three targets in this example.

Similarly to the example of 903, a sparse array interpolation is performed, e.g. the input data is for channels 1, 3, 4, 7, 8, 10, 11, 12, 15, 16 and data for channels 2, 5, 6, 9, 13, 14 is generated by the neural network.

It can be seen that with the neural network output the peaks are very accurate. The sidelobes are not equal, but at the same level as for the reference (due to remaining error in network).

It should be noted that training may be performed by an external device. For example, the machine learning model may be trained by a computer and later be stored in a device implementing the AI processing. Nevertheless, the training device may be regarded as part of the radar system, even if it is external.

Figure 19:
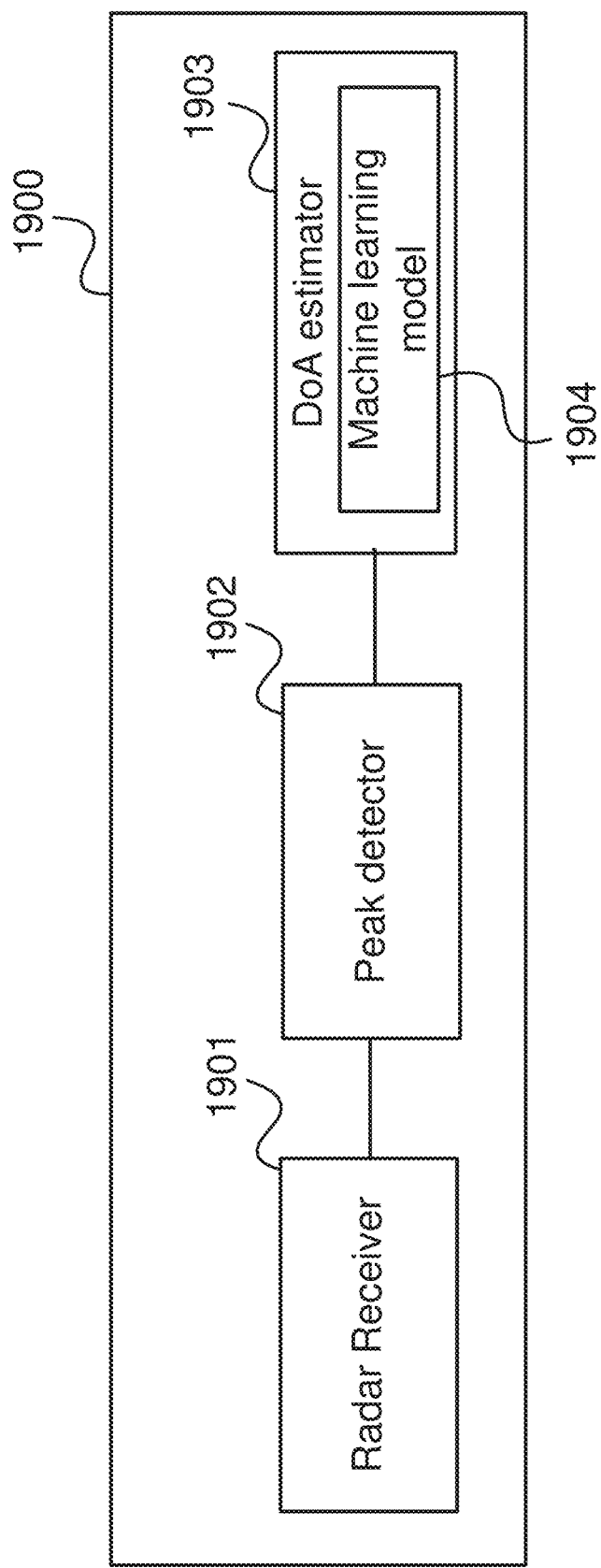
FIG. 19 shows a radar system according to an embodiment.

In summary, according to various embodiments, a radar system is provided as illustrated in FIG. 19.

FIG. 19 shows a radar system 1900 according to an embodiment.

The radar system 1900 includes a radar receiver 1901 configured to receive radio signals, wherein each radio signal is associated with a channel of a plurality of channels, each channel corresponding to a pair of transmit antenna and receive antenna.

The radar system 1900 further comprises a peak detector 1902 configured to perform peak detection using the received radio signals, wherein each detected peak corresponds to a detected object.

Further, the radar system 1900 comprises a direction of arrival estimator 1903 configured to, for a detected peak, generate a vector having, for each of the channels, an entry specifying a Doppler Fourier transform result for the channel calculated from radio signals transmitted from the transmit antenna and received by the receive antenna of the pair to which the channel corresponds, supply the vector to a machine learning model 1904 trained to output, for each of one or more additional channels, an entry specifying a predicted Doppler Fourier transform result corresponding to the additional channel and perform direction-of-arrival estimation using an output from the machine learning model which the machine learning model 1904 outputs in response to being supplied with the vector.

According to various examples, in other words, DoA determination input data is supplemented by means of a neural network (trained for that purpose) such that the number of channels for which DoA determination input data is available is increased.

Figure 20:
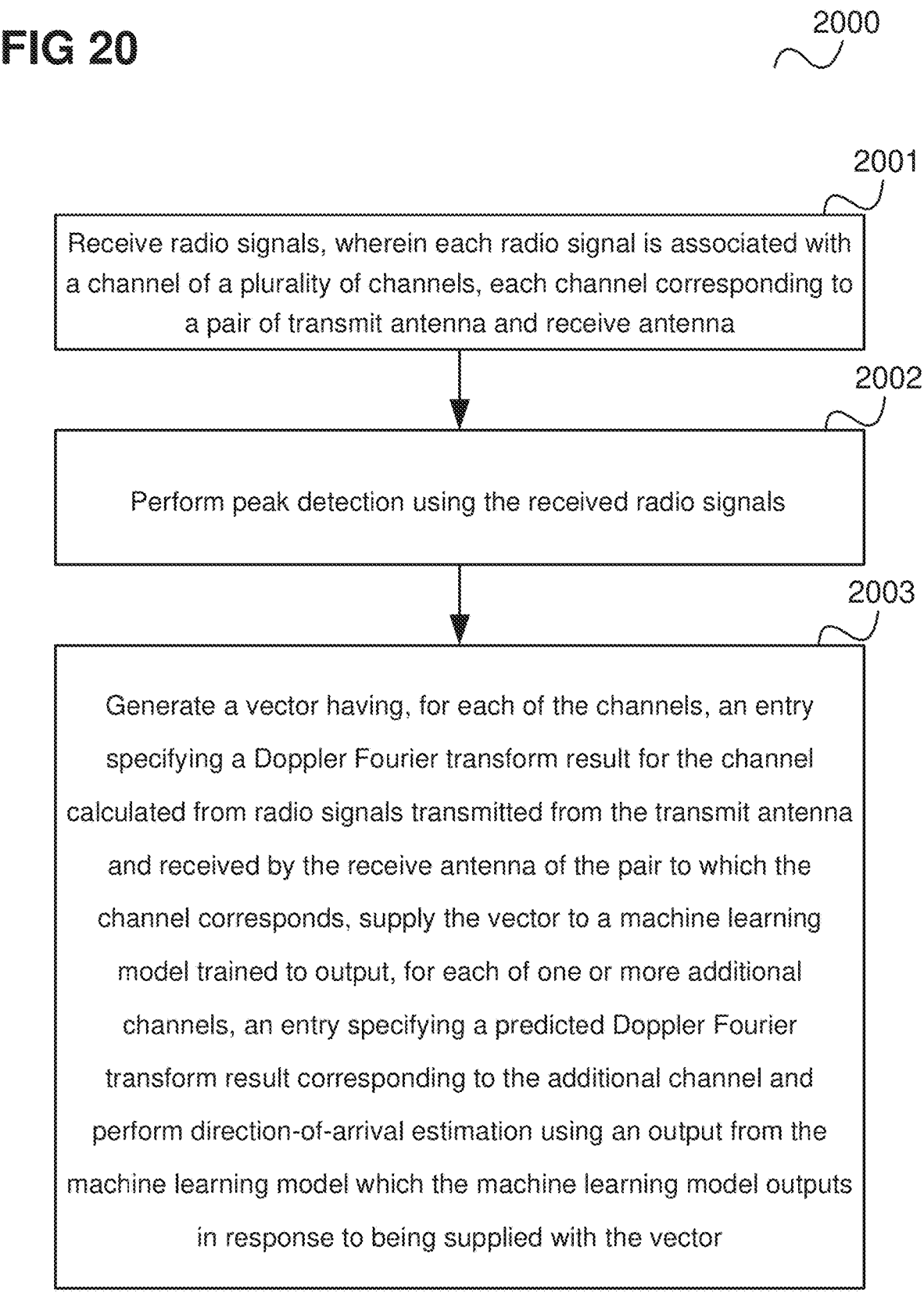
FIG. 20 shows a flow diagram illustrating a method for performing direction of arrival estimation in a radar system.

According to various examples a method as illustrated in FIG. 20 is performed.

FIG. 20 shows a flow diagram illustrating a method for performing direction of arrival estimation in a radar system.

In 2001, radio signals are received wherein each radio signal is associated with a channel of a plurality of channels, each channel corresponding to a pair of transmit antenna and receive antenna.

In 2002, peak detection is performed using the received radio signals, wherein each detected peak corresponds to a detected object.

In 2003, for a detected peak, a vector is generated having, for each of the channels, an entry specifying a Doppler Fourier transform result for the channel calculated from radio signals transmitted from the transmit antenna and received by the receive antenna of the pair to which the channel corresponds, the vector is supplied to a machine learning model trained to output, for each of one or more additional channels, an entry specifying a predicted Doppler Fourier transform result corresponding to the additional channel and direction-of-arrival estimation is performed using an output from the machine learning model which the machine learning model outputs in response to being supplied with the vector.

The method may be performed and the components of the radar system may be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which are described herein in more detail may also be understood as a "processor". The radar receiver, the peak detector and the direction of arrival estimator may each be implemented by one or more circuits. For example, the peak detector and the direction of arrival estimator may be implemented by the radar signal processing circuit 111. They may be part of radar signal processing chain, e.g. implemented by one or more microcontrollers.

The following examples pertain to further exemplary implementations.

Example 1 is a radar system as described with reference to FIG. 19.

Example 2 is the radar system of Example 1, comprising a radar processor configured to generate, for each channel, a range-Doppler map from radio signals associated with the channel and wherein, for each channel, the entry is a Doppler Fourier transform result value that the range-Doppler map generated for the channel contains for a range bin and a velocity bin of the detected peak.

Example 3 is the radar system of Example 2, wherein, for each of the one or more additional channels, the predicted Doppler Fourier transform result is a Doppler Fourier transform result value for a range bin and a velocity bin of the detected peak for the additional channel.

Example 4 is the radar system of Example 2 or 3, wherein the peak detector is configured to perform the peak detection by integrating the range-Doppler maps generated for the channels to an aggregate range-Doppler map and identify peaks in the aggregate range-Doppler map.

Example 5 is the radar system of any one of Examples 1 to 4, wherein each channel and each additional channel is associated with a respective position in an array of receive antennas and wherein the machine learning model is configured to generate, for each additional channel, the predicted Doppler Fourier transform result as if the predicted Doppler Fourier transform result was calculated from receive signals received via a receive antenna at the position associated with the additional channel.

Example 6 is the radar system of Example 5, wherein at least some of the additional channels are associated with positions between positions associated with channels of the plurality of channels.

Example 7 is the radar system of Example 5 or 6, wherein at least some of the additional channels are associated with positions at one side of the positions associated with the channels of the plurality of channels.

Example 8 is the radar system of any one of Examples 5 to 7, wherein the array of receive antennas is a uniform array.

Example 9 is the radar system of any one of Examples 5 to 8, wherein the radar system is a multiple input multiple output radar system and wherein the array of receive antennas comprises virtual receive antennas.

Example 10 is the radar system of any one of Examples 1 to 9, wherein the vector comprises zero entries for the one or more additional channels and the machine learning model is trained to fill the zero entries with entries specifying a Doppler Fourier transform result of the peak predicted to be calculated from radio signals transmitted via the additional channels.

Example 11 is the radar system of any one of Examples 1 to 10, wherein the machine learning model is a machine learning model trained to update the entries of the vector for the plurality of channels and the direction of arrival estimator is configured to perform direction-of-arrival estimation using the updated entries.

Example 12 is the radar system of any one of Examples 1 to 11, comprising a training device configured to train the machine learning model.

Example 13 is the radar system of Example 12, wherein the training device is configured to train the machine learning model by supervised learning wherein the training device is configured to generate each of a multiplicity of ground truth vectors by simulation of received radio signals and processing it to a determination-of-arrival input vector or simulating a determination-of-arrival input vector.

Example 14 is the radar system of Example 13, wherein the ground truth vector comprises, for each of the one or more additional channels, a ground truth entry specifying a predicted Doppler Fourier transform result for a detected peak with which the ground truth vector is associated.

Example 15 is the radar system of Example 14, wherein the ground truth vector additionally comprises, for each of the one or more channels, a ground truth entry specifying a predicted Doppler Fourier transform result for a detected peak with which the ground truth vector is associated.

Example 16 is the radar system of any one of Examples 13 to 15, wherein the training device is configured to generate a multiplicity of ground truth vectors by varying at least one of a number of targets of a scene for which the ground truth vectors are generated, locations of the respective number of targets in the scene, radar cross sections of the targets in the scene, signal-to-noise ratios of the targets in the scene and channel phase errors to train the machine learning model using the multiplicity of ground truth vectors.

Example 17 is the radar system of any one of Examples 1 to 16, wherein the machine learning model is a neural network.

Example 18 is the radar system of Example 17, wherein the machine learning model comprises at least one of a multi-layer perceptron and an autoencoder.

Example 19 is a method for performing direction of arrival estimation in a radar system as described with reference to FIG. 20.

Example 20 is the method of Example 19, further comprising training the machine learning model.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

REFERENCE SIGNS 100 radar arrangement
101 radar device
102 antenna arrangement
103 radar control device
104 transmitter
105 duplexer
106 receiver
107 controller
108 object
109 transmit signal
110 echo
111 radar signal processing circuit
200 FMCW radar system
201 saw tooth waveform
202 oscillator
203 transmit antenna
204 receive antenna
205 mixer
206 low pass filter
207 spectrum analyzer
208 chirp
300 radar device
301 oscillator with ramper
302 transmit amplifiers
303 mixers
304 analog filters
305 ADCs
306 digital interface
307 radar signal processor
308 radar signal processing circuit
309 output interface
310 MMIC
311 power amplifier
312 transmit signal interface
401 MMIC
402 Radar signal processing chain
403-411 Radar processing
500 data cube
501 aggregate range/Doppler map
502 FFT peaks
503 receive antennas
601, 602 Graphs
700 Virtual radar channel diagram
801 MMIC
808 DoA determination
812 AI processing
901-904 Diagrams
1000 Neural network
1100 Neural network
1200 Neural network
1300 Neural network
1301 Input data
1302 Input vector
1303 Output vector
1400 Neural network
1500 Neural network
1501 Input data
1052 Output vector
1601-1603 Graphs
1701-1703 Graphs
1801, 1802 Graphs
1900 Radar system
1901 Radar receiver
1902 Peak detector
1903 DoA estimator
1904 Machine learning model
2000 Flow diagram
2001-2003 Processing

The invention claimed is:

1. A radar system, comprising:
A radar receiver configured to receive radio signals, wherein each radio signal is associated with a channel of a plurality of channels, each channel corresponding to a pair of transmit antenna and receive antenna;
A peak detector configured to perform peak detection using the received radio signals, wherein each detected peak corresponds to a detected object; and
A direction of arrival estimator configured to, for a detected peak,
generate a vector having, for each of the channels, an entry specifying a Doppler Fourier transform result for the channel calculated from radio signals transmitted from the transmit antenna and received by the receive antenna of the pair to which the channel corresponds;
Supply the vector to a machine learning model trained to output, for each of one or more additional channels, an entry specifying a predicted Doppler Fourier transform result corresponding to the additional channel; and
perform direction-of-arrival estimation using an output from the machine learning model which the machine learning model outputs in response to being supplied with the vector.

2. The radar system of claim 1, comprising a radar processor configured to generate, for each channel, a range-Doppler map from radio signals associated with the channel and wherein, for each channel, the entry is a Doppler Fourier transform result value that the range-Doppler map generated for the channel contains for a range bin and a velocity bin of the detected peak.

3. The radar system of claim 2, wherein, for each of the one or more additional channels, the predicted Doppler Fourier transform result is a Doppler Fourier transform result value for a range bin and a velocity bin of the detected peak for the additional channel.

4. The radar system of claim 2, wherein the peak detector is configured to perform the peak detection by integrating the range-Doppler maps generated for the channels to an aggregate range-Doppler map and identify peaks in the aggregate range-Doppler map.

5. The radar system of claim 1, wherein each channel and each additional channel is associated with a respective position in an array of receive antennas and wherein the machine learning model is configured to generate, for each additional channel, the predicted Doppler Fourier transform result as if the predicted Doppler Fourier transform result was calculated from receive signals received via a receive antenna at the position associated with the additional channel.

6. The radar system of claim 5, wherein at least some of the additional channels are associated with positions between positions associated with channels of the plurality of channels.

7. The radar system of claim 5, wherein at least some of the additional channels are associated with positions at one side of the positions associated with the channels of the plurality of channels.

8. The radar system of claim 5, wherein the array of receive antennas is a uniform array.

9. The radar system of claim 5, wherein the radar system is a multiple input multiple output radar system and wherein the array of receive antennas comprises virtual receive antennas.

10. The radar system of claim 1, wherein the vector comprises zero entries for the one or more additional channels and the machine learning model is trained to fill the zero entries with entries specifying a Doppler Fourier transform result of the peak predicted to be calculated from radio signals transmitted via the additional channels.

11. The radar system of claim 1, wherein the machine learning model is a machine learning model trained to update the entries of the vector for the plurality of channels and the direction of arrival estimator is configured to perform direction-of-arrival estimation using the updated entries.

12. The radar system of claim 1, comprising a training device configured to train the machine learning model.

13. The radar system of claim 12, wherein the training device is configured to train the machine learning model by supervised learning wherein the training device is configured to generate each of a multiplicity of ground truth vectors by simulation of received radio signals and processing it to a determination-of-arrival input vector or simulating a determination-of-arrival input vector.

14. The radar system of claim 13, wherein the ground truth vector comprises, for each of the one or more additional channels, a ground truth entry specifying a predicted Doppler Fourier transform result for a detected peak with which the ground truth vector is associated.

15. The radar system of claim 14, wherein the ground truth vector additionally comprises, for each of the one or more channels, a ground truth entry specifying a predicted Doppler Fourier transform result for a detected peak with which the ground truth vector is associated.

16. The radar system of claim 13, wherein the training device is configured to generate a multiplicity of ground truth vectors by varying at least one of a number of targets of a scene for which the ground truth vectors are generated, locations of the respective number of targets in the scene, radar cross sections of the targets in the scene, signal-to-noise ratios of the targets in the scene and channel phase errors to train the machine learning model using the multiplicity of ground truth vectors.

17. The radar system of claim 1, wherein the machine learning model is a neural network.

18. The radar system of claim 17, wherein the machine learning model comprises at least one of a multi-layer perceptron and an autoencoder.

19. A method for performing direction of arrival estimation in a radar system, the method comprising:
   receiving radio signals, wherein each radio signal is associated with a channel of a plurality of channels, each channel corresponding to a pair of transmit antenna and receive antenna;
   perform peak detection using the received radio signals, wherein each detected peak corresponds to a detected object; and
   for a detected peak,
      generating a vector having, for each of the channels, an entry specifying a Doppler Fourier transform result for the channel calculated from radio signals transmitted from the transmit antenna and received by the receive antenna of the pair to which the channel corresponds;
      supplying the vector to a machine learning model trained to output, for each of one or more additional channels, an entry specifying a predicted Doppler Fourier transform result corresponding to the additional channel; and
      performing direction-of-arrival estimation using an output from the machine learning model which the machine learning model outputs in response to being supplied with the vector.

20. The method of claim 19, further comprising training the machine learning model.

* * * * *